(12) United States Patent
Shimada et al.

(10) Patent No.: US 11,987,104 B2
(45) Date of Patent: May 21, 2024

(54) VEHICLE DOOR SEALING MEMBER

(71) Applicants: Nishikawa Rubber Co., Ltd., Hiroshima (JP); HONDA MOTOR CO., LTD., Tokyo (JP)

(72) Inventors: Hiroshi Shimada, Hiroshima (JP); Toshifumi Matsuura, Hiroshima (JP); Yoshimitsu Iida, Tokyo (JP); Sotaro Hashiguchi, Tokyo (JP)

(73) Assignees: Nishikawa Rubber Co., Ltd., Hiroshima (JP); HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 17/581,871

(22) Filed: Jan. 22, 2022

(65) Prior Publication Data

US 2022/0234431 A1 Jul. 28, 2022

(30) Foreign Application Priority Data

Jan. 27, 2021 (JP) ................. 2021-011387

(51) Int. Cl.
*B60J 10/86* (2016.01)

(52) U.S. Cl.
CPC .................... *B60J 10/86* (2016.02)

(58) Field of Classification Search
CPC ...................................................... B60J 10/52
See application file for complete search history.

(56) References Cited

U.S. PATENT DOCUMENTS

| 2008/0282616 | A1* | 11/2008 | Eguchi ..................... | B60J 10/30 49/489.1 |
| 2009/0056229 | A1* | 3/2009 | Mugishima .............. | B60J 10/86 49/493.1 |
| 2014/0312649 | A1* | 10/2014 | Hashiguchi ............. | B60J 5/0413 296/146.5 |
| 2018/0298678 | A1* | 10/2018 | Amagai ................. | E06B 7/2309 |
| 2018/0298679 | A1* | 10/2018 | Matsuura .............. | E06B 7/2312 |
| 2020/0300018 | A1* | 9/2020 | Kamitani ................ | B60J 10/25 |

FOREIGN PATENT DOCUMENTS

| EP | 3050728 A1 * | 8/2016 | ............ B60J 10/25 |
| EP | 3050730 A1 * | 8/2016 | ............ B60J 10/25 |
| JP | S64-030716 U | 2/1989 | |
| JP | 2002120563 A * | 4/2002 | |
| JP | 2004-051054 A | 2/2004 | |

(Continued)

*Primary Examiner* — Lori Lyjak
(74) *Attorney, Agent, or Firm* — Renner, Otto, Boisselle & Sklar, LLP

(57) ABSTRACT

In an upper side sealing portion, an upper side water guide groove is formed between an outer sealing lip and an inner sealing lip. In a vertical side sealing portion, a vertical side water guide groove extending to a position below a door opening/closing device is formed between a vertical side attachment portion and a vertical side sealing lip. The upper side water guide groove is disposed at a cabin inner side of an outer panel of a frame. An upper end of the vertical side water guide groove is disposed at the cabin inner side of the outer panel. A portion of the vertical side water guide groove located above the door opening/closing device extends downward from an upper end, and extends to a cabin outer side relative to an inner panel of a frame.

8 Claims, 13 Drawing Sheets

(56) References Cited

FOREIGN PATENT DOCUMENTS

| | | | | | |
|---|---|---|---|---|---|
| JP | 2006-069494 | A | | 3/2006 | |
| JP | 2006315561 | A | * | 11/2006 | ............. B60J 10/86 |
| JP | 2007331730 | A | * | 12/2007 | |
| JP | 2010143516 | A | * | 7/2010 | |
| JP | 2011168177 | A | * | 9/2011 | |
| JP | 2021084594 | A | * | 6/2021 | |

* cited by examiner

VEHICLE DOOR SEALING MEMBER

CROSS-REFERENCE TO RELATED APPLICATION

This application claims priority to Japanese Patent Application No. 2021-011387 filed on Jan. 27, 2021, the disclosure of which including the specification, the drawings, and the claims is hereby incorporated by reference in its entirety.

TECHNICAL FIELD

The present disclosure relates to a vehicle door sealing member that is attached to a door of a vehicle.

BACKGROUND ART

Doors of vehicles used to date are provided with sealing members for sealing gaps between the doors and door openings of vehicle bodies (see, for example, Patent Documents 1 through 3). The sealing member of Japanese Patent Publication No. 2004-051054 includes a hollow sealing portion and a sealing lip extending in the vehicle front-rear direction along the upper side of a sash. A bag-shaped water accommodating portion is integrally formed in a front end portion of the sealing member so that rain water that has flowed forward near the base of the sealing lip is temporarily accommodated in the water accommodating portion. An opening of the water accommodating portion faces in the vehicle forward direction, and rain water accommodated in the water accommodating portion flows forward out of the water accommodating portion.

The sealing member of Japanese Patent Publication No. 2006-069494 also includes a hollow sealing portion and a sealing lip extending in the vehicle front-rear direction along the upper side of a sash. FIG. 4 of Japanese Patent Publication No. 2006-069494 shows a wall extending in the vehicle width direction from the hollow sealing portion to the sealing lip.

The sealing member of Japanese Unexamined Utility Model Registration Application Publication No. S64-030716 is a hollow-type weather strip including a portion extending in the vehicle front-rear direction along the upper side of a sash and a portion extending in the front-rear direction along a lower portion of a door. In a portion of a peripheral wall of this hollow-type weather strip extending along the upper side of the sash, an upper slit for allowing an inflow of rain water is intermittently formed, whereas in a portion extending along the lower portion of the door, a discharge slit is intermittently formed. Accordingly, rain water that has flowed into the hollow-type weather strip from the upper slit flows in the hollow-type weather strip to be discharged from the discharge slit.

SUMMARY

In the sealing member of Japanese Patent Publication No. 2004-051054, since the water accommodating portion is disposed in an upper portion of the sash, water that has flowed out of the water accommodating portion might flow downward to be splashed onto a door opening/closing device. If water is splashed onto the door opening/closing device, water might be frozen to hinder opening and closing of the door in a cold region.

Although Japanese Patent Publication No. 2006-069494 describes the wall extending in the vehicle width direction from the hollow sealing portion to the sealing lip, if a large amount of rain water enters a gap between the hollow sealing portion and the sealing lip, rain water might flow downward across the wall to be splashed on the door opening/closing device. Consequently, water might be frozen to hinder opening and closing of the door in a cold region.

In Japanese Unexamined Utility Model Registration Application Publication No. S64-030716, since the discharge slit is located in a lower portion of the door, water discharged from discharge slit is not splashed on the door opening/closing device, but since the upper slit formed in an upper edge of the sash is intermittently formed, a rain gutter function is not applied to the entire upper edge of the sash. Consequently, there still remains the possibility of a defective phenomenon in which rain water enters the cabin across the hollow-type weather strip.

It is therefore an object of the present disclosure to prevent water that has flowed into a gap between the upper end of a door and a vehicle body from entering a cabin and to enable discharge of water while avoiding splash onto a door opening/closing device.

Terms herein will be defined as follows. A "portion outside the cabin" refers to a portion of a flange at the upper end of a door located at the outer side of a cabin outer surface in FIG. 1 of Japanese Unexamined Utility Model Registration Application Publication No. S64-030716. A "portion between the upper end of the door and the vehicle body" refers to a rain gutter portion constituted by a vehicle outer lip portion, a vehicle inner lip portion, and the bases of these lip portions in an upper slit setting portion in FIG. 1 of Japanese Unexamined Utility Model Registration Application Publication No. S64-030716. A "portion inside the cabin" refers to a portion of the upper slit setting portion located inside a portion in which the vehicle inner lip portion is elastically in contact with the roof portion of the vehicle in FIG. 1 of Japanese Unexamined Utility Model Registration Application Publication No. S64-030716.

To achieve the object, in a first aspect of the present disclosure, in a vehicle door sealing member 1 configured to be attached to a first door 300 for opening and closing a door opening 103 in a side portion of a vehicle body 101 of a vehicle 100, the vehicle door sealing member 1 being configured to seal a gap between the door opening 103 and the first door 300, wherein a portion extending in a vehicle front-rear direction along an upper side 322 of a frame 320 of the first door 300 includes an upper side sealing portion 3, the upper side sealing portion 3 including an upper side attachment portion 30 configured to be attached to the upper side 322, an upper side outer sealing lip 31 configured to be brought into elastic contact with the vehicle body 101 in closing the first door 300, and an upper side inner sealing lip 32 separated from the upper side outer sealing lip 31 to a cabin inner side and configured to be brought into elastic contact with the vehicle body 101 in closing the first door 300, an upper side water guide groove 34 is formed between the upper side outer sealing lip 31 and the upper side inner sealing lip 32 such that water that has entered from a gap between the upper side outer sealing lip 31 and the vehicle body 101 is allowed to flow in the vehicle front-rear direction in the upper side water guide groove 34, a portion extending in a top-bottom direction along a vertical side 321 of the frame 320 of the first door 300 includes a vertical side sealing portion 2, the vertical side sealing portion 2 including a vertical side upper attachment portion 20 configured to be attached to the vertical side 321, a support wall 21 extending from the vertical side upper attachment portion 20 to a cabin outer side, and a vertical side upper sealing lip 22 projecting from the support wall 21 to one side in the vehicle front-rear direction, and configured to be brought into contact with a second door 200 in closing the first door 300 and the second door 200, a vertical side upper water guide groove 24 is formed between the vertical side upper attachment portion 20 and the vertical side upper sealing lip 22, an upper molded portion 5 is provided to connect an end of the upper side sealing portion 3 and an upper end of the vertical side sealing portion 2 to each other, and the upper side water guide groove 34 and the vertical side upper water guide groove 24 are connected to each other through the upper molded portion 5.

With this configuration, when the door 300 is closed, the upper side outer sealing lip 31 and the upper side inner sealing lip 32 extending along the upper side 322 of the frame 320 of the door 300 are brought into elastic contact with the vehicle body 101. At this time, since the upper side outer sealing lip 31 and the upper side inner sealing lip 32 are disposed with an interval in the cabin inside-outside direction and are easily warped to be deformed, a small reaction force is exerted on the door 300 at the moment when the door 300 is closed. Accordingly, closability of the door 300 is enhanced.

When the door 300 is closed, although the upper side outer sealing lip 31 is in elastic contact with the vehicle body, water might enter between a gap between the upper end of the door 300 and the outer sealing surface 101b of the vehicle body 101. The water that has entered flows in the upper side water guide groove 34 between the upper side outer sealing lip 31 and the upper side inner sealing lip 32 in the vehicle front-rear direction.

At this time, since the upper side water guide groove 34 and the vertical side upper water guide groove 24 are connected to each other through the upper molded portion 5, water that has flowed in the upper side water guide groove 34 in the vehicle front-rear direction, flows in the vertical side upper water guide groove 24 in the vehicle top-bottom direction by way of the upper molded portion 5. Accordingly, water is less likely to be splashed onto the door opening/closing devices 213, 311, and 315.

In a second aspect of the present disclosure, the upper molded portion 5 may have an upper molded portion upper side water guide groove 54 and an upper molded portion vertical side water guide groove 59, the upper molded portion upper side water guide groove 54 being connected to an end 34Fe of the upper side water guide groove 34, the upper molded portion vertical side water guide groove 59 being connected to the another end 54Fe of the upper molded portion upper side water guide groove 54, a lower end 59Le of the upper molded portion vertical side water guide groove 59 may be connected to an upper end 24Ue of the vertical side upper water guide groove 24, the upper side water guide groove 34 may be disposed at a cabin inner side of a flange upper side 326a of an outer panel 324 constituting a cabin outer side of the upper side 322 of the frame 320, an upper end 59Ue of the upper molded portion vertical side water guide groove 59 may be disposed at a cabin inner side of a flange vertical side 326b of an outer panel 324 constituting a cabin outer side of the vertical side 321 of the frame 320, and a lower portion 59L of the upper molded portion vertical side water guide groove 59 may extend downward from the upper end 59Ue, and extend to a cabin outer side of the flange vertical side 326b of the outer panel 324 constituting the cabin outer side of the vertical side 321 of the frame 320.

With this configuration, water that has entered flows in the upper side water guide groove 34 between the upper side outer sealing lip 31 and the upper side inner sealing lip 32 in the vehicle front-rear direction. Water that has flowed to the one end 54Fe of the upper molded portion upper side water guide groove 54 through one end 34Fe of the upper side water guide groove 34 in the vehicle front-rear direction, passes through the upper molded portion vertical side water guide groove 59 and enters the vertical side upper water guide groove 24 from the upper end 24Ue of the vertical side water guide groove 24 to flow downward. At this time, the lower portion 59L below the upper end 59Ue of the upper molded portion vertical side water guide groove 59 extends downward, and extends to the cabin outer side of the flange vertical side 326b of the outer panel 324 of the vertical side 321 of the frame 320. Thus, water in the upper molded portion vertical side water guide groove 59 is guided to the cabin outer side of the flange vertical side 326b of the outer panel 324. Accordingly, water is much less likely to be splashed onto the door opening/closing devices 213, 311, and 315.

In a third aspect of the present disclosure, a lower molded portion 8 may be connected to a lower end of the vertical side sealing portion 2, and a vertical side lower sealing portion 6 may be connected to a lower end of the lower molded portion 8, a lower molded portion water guide groove 84 may be connected to a lower end 24Le of the vertical side upper water guide groove 24, and a vertical side lower water guide groove 64 may be connected to a lower end 84Le of the lower molded portion water guide groove 84, and a lower end 64Le of the vertical side lower water guide groove 64 may be located below a door opening/closing device 213, 311, 315 configured to open and close the first door 300 and the second door 200.

With this configuration, since the upper side sealing portion 3, the upper molded portion 5, the vertical side sealing portion 2, the lower molded portion 8, and the vertical side lower sealing portion 6 are integrally formed, water flowing in the water guide groove hardly leaks in the middle. In addition, since the lower end 64Le of the vertical side lower water guide groove 64 is disposed below the door opening/closing device 213, 311, 315, water is discharged below the door opening/closing device 213, 311, 315. This configuration can also further reduce splash of water onto the door opening/closing device 213, 311, 315.

In a fourth aspect of the present disclosure, a bottom portion 54b of the upper molded portion upper side water guide groove 54 may be located at a lower position toward a first end 54Fe in the vehicle front-rear direction.

With this configuration, water in the upper molded portion upper side water guide groove 54 flows in one way in the vehicle front-rear direction and easily enters the vertical side upper water guide groove 24.

In a fifth aspect of the present disclosure, the vertical side upper attachment portion 20 may include an inner wall 20a disposed at a cabin inner side of a flange vertical side 326b of the vertical side 321, the flange vertical side 326b extending in the top-bottom direction, an outer wall 20b disposed at a cabin outer side of the flange vertical side 326b, and a coupling wall 20c extending from the inner wall 20a to the outer wall 20b and coupling the inner wall 20a and the outer wall 20b to each other, the support wall 21 may project to a cabin outer side from a second end of the outer wall 20b in the vehicle front-rear direction, and the vertical side upper water guide groove 24 may be formed by the vertical side upper sealing lip 22, the outer wall 20b, and the support wall 21.

With this configuration, the flange vertical side 326b of the vertical side 321 of the frame 320 is held between the inner wall 20a and the outer wall 20b of the vertical side upper attachment portion 20 so that the vertical side upper attachment portion 20 can be attached to the flange vertical side 326b of the vertical side 321. In this case, the vertical side upper water guide groove 24 can be formed by using the vertical side upper sealing lip 22, the outer wall 20b, and the support wall 21, and thus, a shape only for forming the water guide groove 24 does not need to be set.

In a sixth aspect of the present disclosure, a vertical side core material 25 of a material harder than a material constituting the vertical side upper sealing lip 22 may be embedded in the inner wall 20a, the outer wall 20b, and the coupling wall 20c.

With this configuration, since the vertical side upper attachment portion 20 can be firmly attached to the flange vertical side 326b of the vertical side 321, deformation and displacement of the vertical side upper water guide groove 24 is reduced so that water can be guided to an intended location.

In a seventh aspect of the present disclosure, the vertical side upper sealing lip 22 may be curved or bent such that the vertical side upper sealing lip is located closer to a cabin inner side toward a first end in vehicle front-rear direction.

With this configuration, since the opening width of the vertical side upper water guide groove 24 can be reduced, water in the vertical side upper water guide groove 24 does not easily leaks out of the vertical side upper water guide groove 24.

In an eighth aspect of the present disclosure, the upper side outer sealing lip 31 may be configured to be brought into elastic contact with the vehicle body 101 in a state where the upper side outer sealing lip 31 is curved or tilted to be located closer to a cabin outer side toward an upper end of the upper side outer sealing lip 31.

With this configuration, a sealing pressure of a sealing portion in which the upper side outer sealing lip 31 is in elastic contact with the vehicle body 101 is high, and thus, the amount of water entering a gap can be reduced.

The present disclosure provides a door sealing member with a reduced door closing force in which water that has flowed into a gap between the upper end of a door and a vehicle body does not enter a cabin and is guided to one end of the vehicle, and then guided to the cabin outer side and to a location below a door opening/closing device so that water can be discharged without splashing onto the door opening/closing device.

DETAILED DESCRIPTION

An embodiment of the present disclosure will be described in detail with reference to the drawings. The following embodiment is merely a preferred example in nature, and is not intended to limit the invention, applications, and use of the applications.

Figure 1:
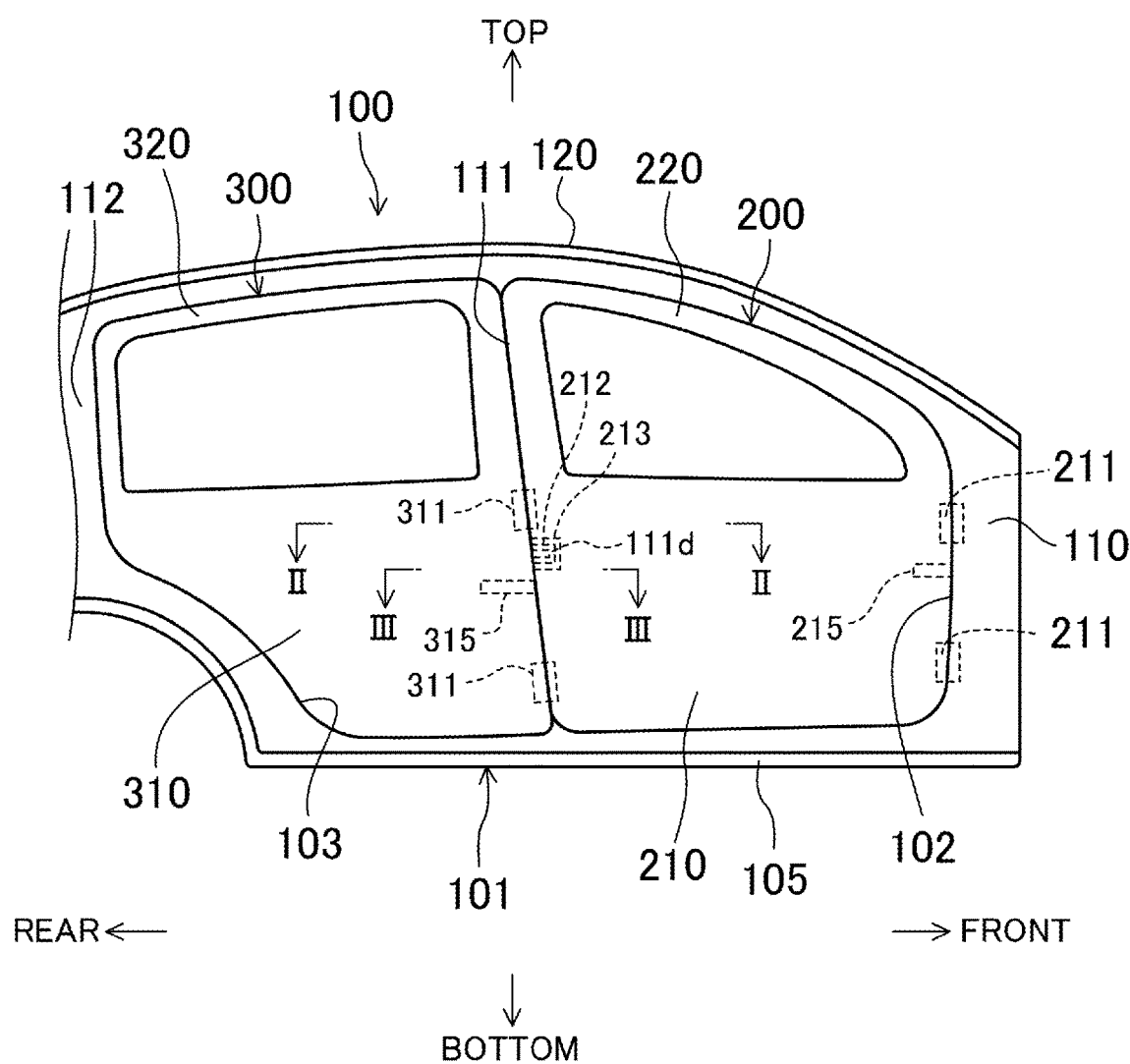
FIG. 1 is a right side view illustrating a part of a vehicle body of a vehicle according to an embodiment of present disclosure.

FIG. 1 is a right side view illustrating a part of a vehicle body 101 of a vehicle 100 according to an embodiment of present disclosure. The vehicle 100 is an automobile, and has a driver's seat, a passenger's seat, and a rear seat in a cabin. In description of this embodiment, the front side of the vehicle will be simply referred to as a front, and the rear side of the vehicle will be simply referred to as a rear. A vehicle width direction is a lateral direction (left-right direction) of the vehicle body 101, and corresponds to the cabin inside-outside direction.

(Configuration of Vehicle Body 101)

A right side sill 105 extends in the front-rear direction in a right lower portion of the vehicle body 101. In a right side portion of the vehicle body 101, a right front pillar 110, a right center pillar 111, and a right rear pillar 112 extend upward from the right side sill 105. In an upper portion of the vehicle body 101, a roof portion 120 extends from the upper end of the right front pillar 110 to the upper end of the right rear pillar 112 by way of the upper end of the right center pillar 111. In this configuration, at the front side of the right side portion of the vehicle body 101, a front door opening 102 is defined by the right side sill 105, the right front pillar 110, the right center pillar 111, and the roof portion 120.

At the rear side of the right side portion of the vehicle body 101, a rear door opening 103 is defined by the right side sill 105, the right center pillar 111, the right rear pillar 112, and the roof portion 120.

Figure 4:
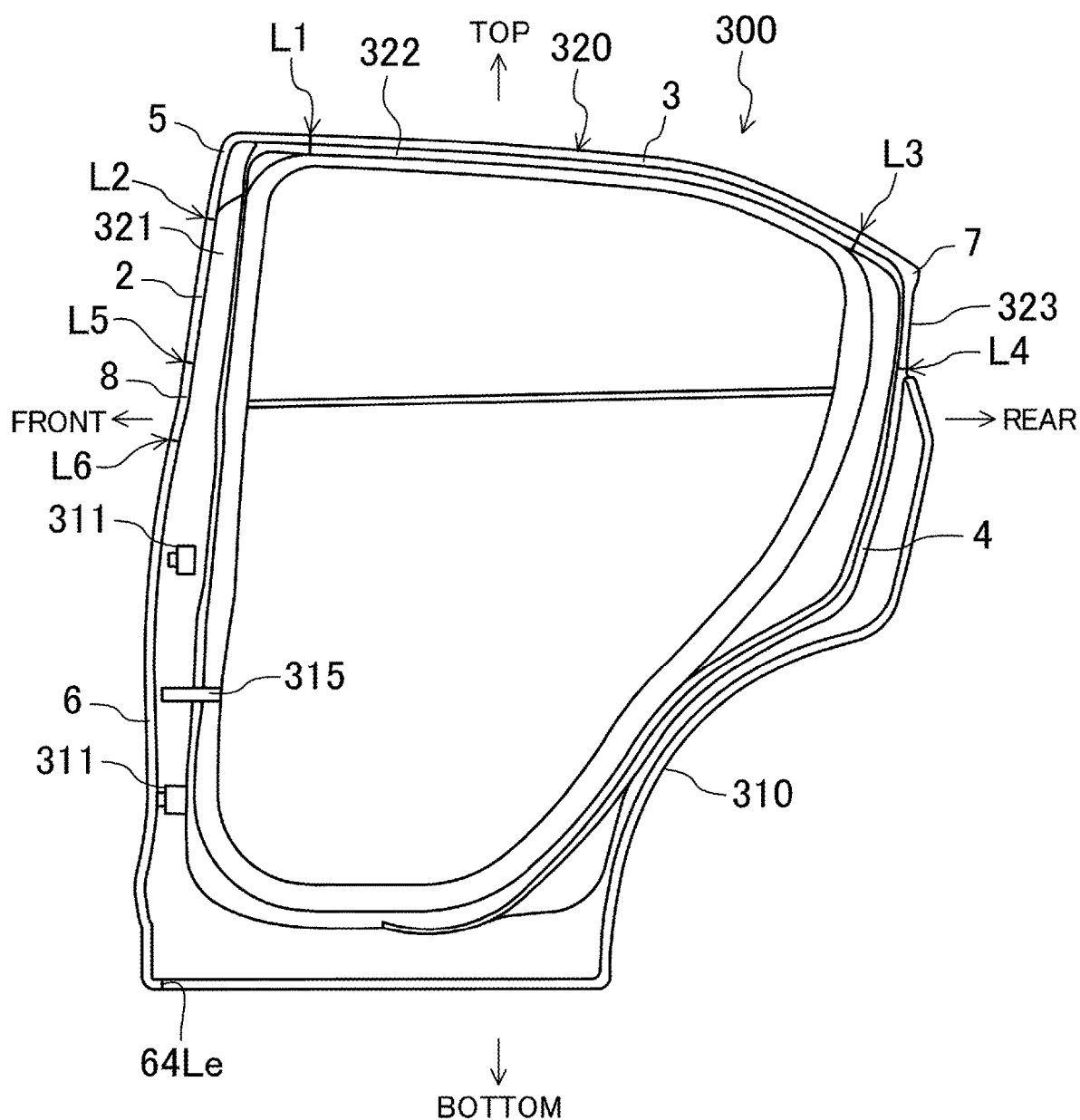
FIG. 4 is a side view of a right rear door to which a vehicle door sealing member is attached, when seen from the cabin inner side.

The front door opening 102 is covered and uncovered by a front door 200, and the rear door opening 103 is covered and uncovered by a rear door 300 illustrated in FIG. 4.

Figure 2:
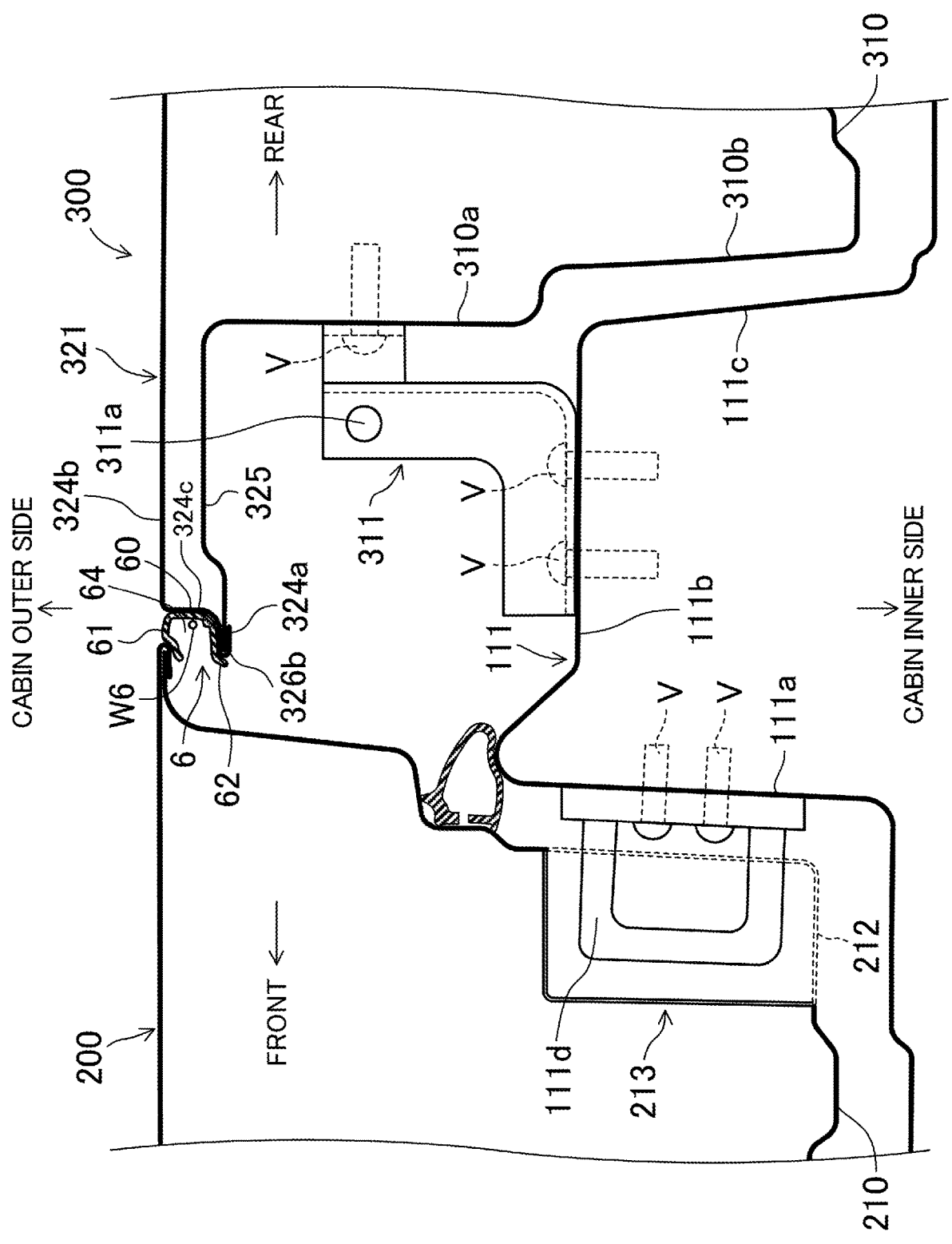
FIG. 2 is a cross-sectional view taken along line II-II in FIG. 1.

As illustrated in FIG. 2, a striker 111d projects forward from an intermediate portion in the top-bottom direction of a front side surface 111a of the right center pillar 111. The striker 111d is a member for holding the front door 200 in a closed state, which will be described later.

The left side of the vehicle body 101 has a configuration similar to that of the right side, and the present disclosure is applicable to either the right side or the left side of the vehicle body 101. The following description will now be given on a case where the present disclosure is applied to the right side of the vehicle body 101. The present disclosure is also applicable to the front door 200.

(Configuration of Front Door 200)

As illustrated in FIG. 1, the front door 200 includes a door body 210 constituting substantially a lower half of the front door 200, a frame 220 constituting substantially an upper half of the front door 200, and a window pane (not shown) held by the frame 220. Two front door hinges 211 are attached to the front end of the front door body 210 and are spaced from each other in the top-bottom direction. The front door hinges 211 are members supporting the front door 200 to the right front pillar 110 of the vehicle body 101 such that the front door 200 is pivotable about a pivoting axis extending in the top-bottom direction.

A front door checker 215 is attached between the two upper and lower front door hinges 211 at the front end of the front door body 210. The front door checker 215 is a member that restricts the amount of pivoting of the front door body 210, is disposed between the front pillar 110 and the front door body 210, and is pivotably coupled to the front pillar 110 and the front door body 210. The front door hinges 211 and the front door checker 215 have structures known to date. In FIG. 4, a door trim and other members are not shown.

On the other hand, the rear end of the door body 210 has a striker hole 212 in which the striker 111*d* of the vehicle body 101 is fitted when the front door 200 is closed. A door latch device 213 is provided inside the door body 210. The door latch device 213 is a device configured such that when the front door 200 is closed, the door latch device 213 is engaged with the striker 111*d* in the striker hole 212 to hold the closed front door 200. The door latch device 213 has a structure known to date. The engaged state of the door latch device 213 is canceled to open the front door 200 by operating a door handle (not shown).

(Configuration of Rear Door 300)

As illustrated in FIG. 1, the rear door 300 includes a door body 310 constituting substantially a lower half of the rear door 300, a frame 320 constituting substantially an upper half of the rear door 300, and a window pane (not shown) held by the frame 320.

As illustrated in FIG. 4, the frame 320 includes a front vertical side 321, an upper side 322, and a rear vertical side 323. The front vertical side 321 extends upward from a front portion of the door body 310. The upper side 322 extends in the front-rear direction, and the front end of the upper side 322 is continuous to the upper end of the front vertical side 321.

Figure 13:
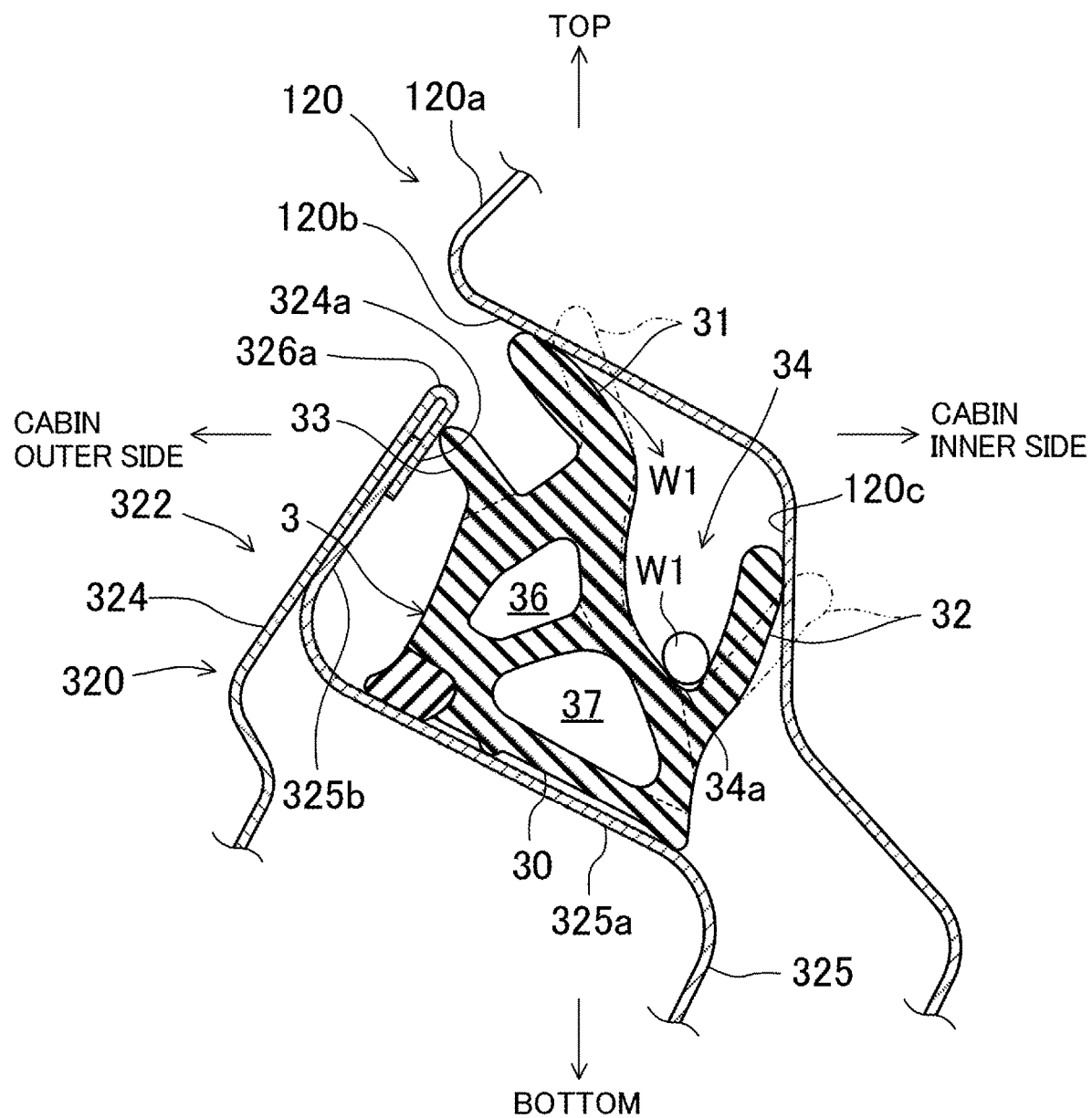
FIG. 13 is a cross-sectional view taken along line XIII-XIII in FIG. 8.

The rear vertical side 323 extends upward from a rear portion of the door body 310, and the upper end of the rear vertical side 323 is continuous to the rear end of the upper side 322. As illustrated in FIG. 13 (cross section taken along line XIII-XIII in FIG. 8), the frame 320 is constituted by an outer panel 324 constituting a cabin outer side and an inner panel 325 constituting a cabin inner side.

An upper portion of the inner panel 325 includes an upper side sealing member attachment plate 325*a* extending toward the outer panel 324, and an inner panel upper plate 325*b* bent upward from a portion near the outer panel 324. The inner panel upper plate 325*b* overlaps with a cabin inner surface of the outer panel 324.

A bent portion 324*a* is bent toward the cabin inner side at the upper rim of the outer panel 324, and overlaps with the cabin inner surface of the inner panel upper plate 325*b*. The upper side sealing member attachment plate 325*a* tilts to rise toward the cabin outer side.

Figure 12:
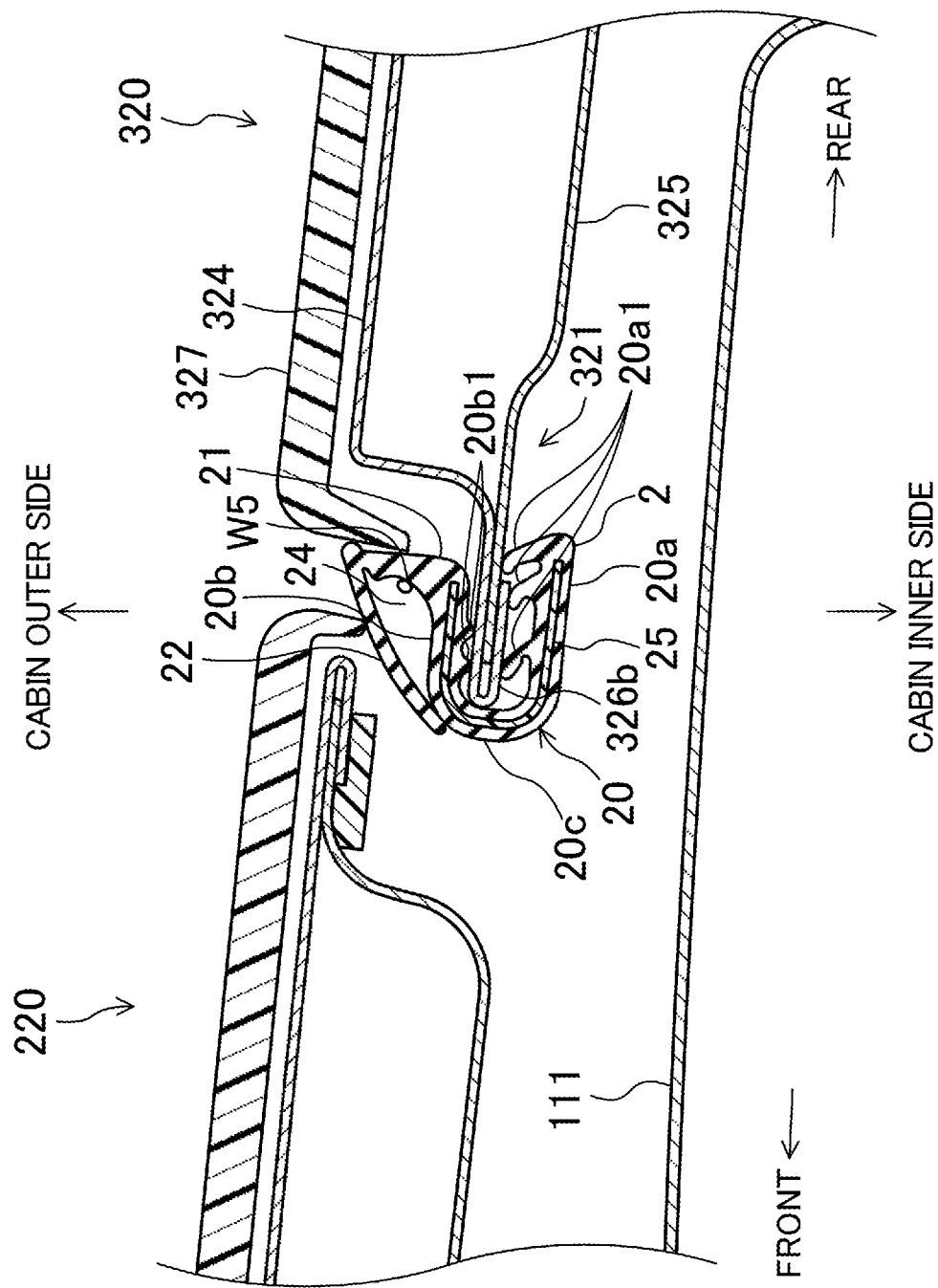
FIG. 12 is a cross-sectional view taken along line XII-XII in FIG. 8.

The outer panel 324 and the inner panel 325 constituting the upper side 322 of the frame 320 form a flange upper side 326*a*. The flange upper side 326*a* of the upper side 322 projects to the vehicle inner side from the upper end of the upper side 322, and extends in the vehicle front-rear direction. As illustrated in FIG. 12, the front vertical side 321 of the frame 320 has a structure similar to that of the upper side 322.

The outer panel 324 and the inner panel 325 constituting the front vertical side 321 of the frame 320 form a flange front vertical side 326*b*. The flange front vertical side 326*b* of the front vertical side 321 projects forward from the front end of the front vertical side 321, and extends in the top-bottom direction. The lower side of the flange front vertical side 326*b* reaches the door body 310. In addition, a garnish 327 (shown in FIGS. 10 through 12) extending in the top-bottom direction is attached to the cabin outer side of the outer panel 324 constituting the front vertical side 321.

As illustrated in FIG. 4, two rear door hinges 311 are attached to the front end of the rear door body 310, and are spaced from each other in the top-bottom direction. The rear door hinges 311 are members supporting the rear door 300 such that the rear door 300 is rotatable about a pivoting axis extending in the top-bottom direction with respect to a center pillar 111 of the vehicle body 101. As illustrated in FIG. 2 (cross-sectional view taken along line II-II in FIG. 1), more specifically, the body of each rear door hinge 311 has a substantially L shape, and the front side of the L shape is fixed to a center pillar vehicle outer surface 111*b* with, for example, a bolt V, a rear side of the L shape is fixed to a front end vehicle outer surface 310*a* of the rear door body 310 with, for example, a bolt V, and the rear door hinge 311 is pivotable on a pivot portion 311*a* at the rear side of the L shape.

Figure 3:
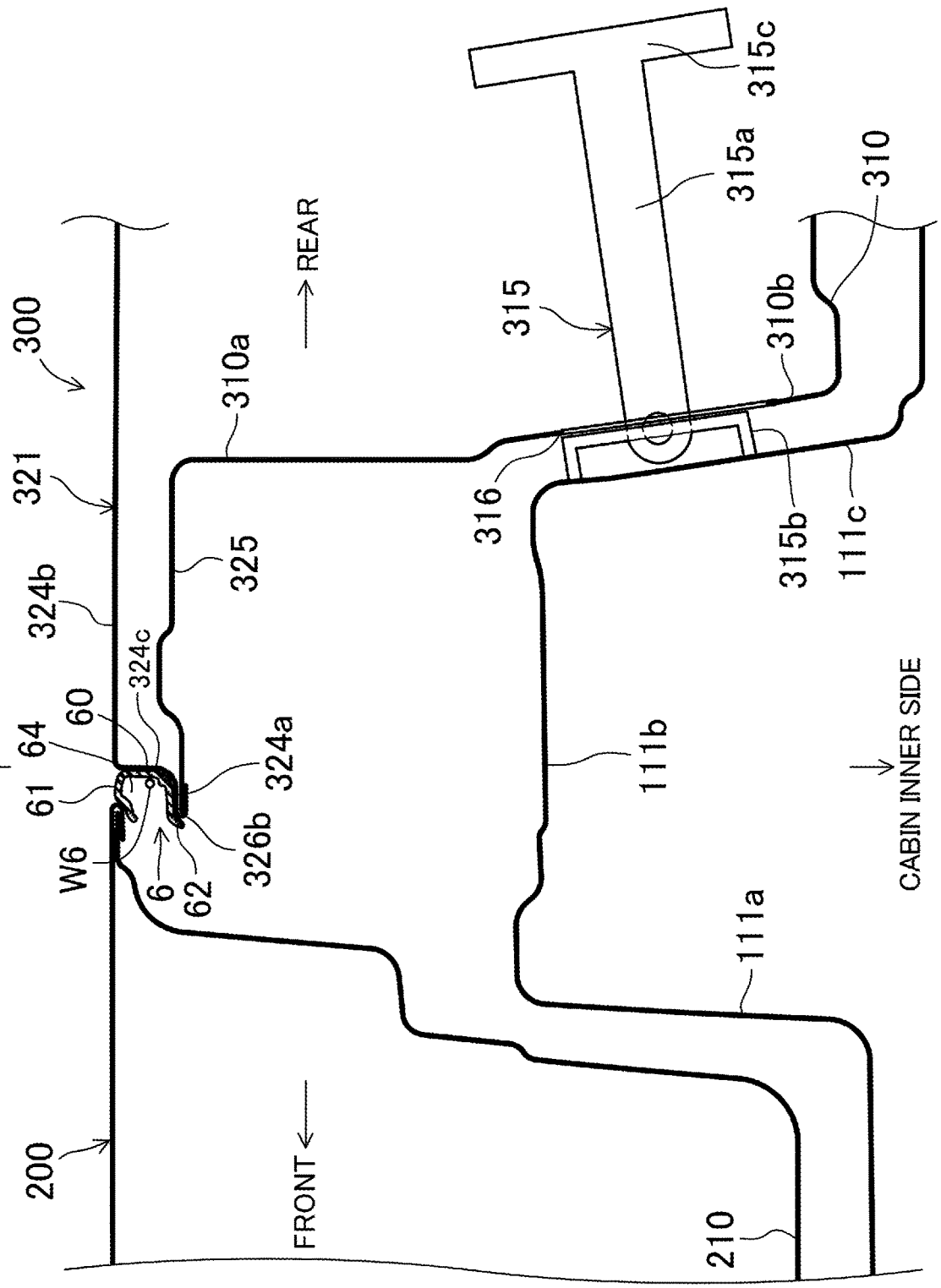
FIG. 3 is a cross-sectional view taken along line III-III in FIG. 1.

As illustrated in FIG. 1, a rear door checker 315 is attached between the two upper and lower rear door hinges 311 on the front end of the rear door body 310. More specifically, as illustrated in FIG. 3 (cross-sectional view taken along line in FIG. 1), the rear door checker 315 is a member for restricting the amount of pivoting of the rear door body 310, disposed between the center pillar 110 and the rear door body 310, and coupled to the center pillar 110.

A body 315*a* of the rear door checker 315 has a substantially flat plate shape. A rear door checker fixture 315*b* is attached to a rear side surface 111*c* of the center pillar 111. A front portion of the body 315*a* of the rear door checker 315 is pivotably attached to the rear door checker fixture 315*b*. A front end vehicle inner surface 310*b* of the rear door body 310 has a hole 316.

A latch portion 315*c* formed in a rear portion of the rear door checker 315 is wider than the hole 316. When the rear door body 310 is opened by the rear door hinges 311, the latch portion 315*c* is brought into contact with a peripheral portion of the hole 316 to thereby restrict pivoting of the rear door body 310. The rear door hinges 311 and the rear door checker 315 have structures known to date.

The door opening/closing device herein includes the door latch device 213, the door hinges 311, the door checker 315, and so forth.

(Configuration of Vehicle Door Sealing Member 1)

A vehicle door sealing member 1 (shown in FIG. 7) for sealing a gap between the rear door 300 and the rear door opening 103 is attached to the rear door 300. The vehicle door sealing member 1 includes a front vertical side sealing portion 2 extending in the top-bottom direction along the front vertical side 321 of the frame 320, an upper side sealing portion 3 extending in the front-rear direction along the upper side 322 of the frame 320, a rear vertical side sealing portion 4 extending downward along the rear vertical side 323 of the frame 320, an upper molded portion 5, a front vertical side lower sealing portion 6, a rear molded portion 7, and a lower molded portion 8.

The front vertical side sealing portion 2, the rear vertical side sealing portion 4, and the front vertical side lower sealing portion 6 are extrusion molded portions integrally shaped by extruding a material from an extrusion die (not shown), and each have a uniform cross section from the upper end to the lower end. The upper side sealing portion 3 is also an extrusion molded portion integrally shaped by extruding a material from an extrusion die (not shown), and has a uniform cross section from the front end to the rear end.

The front vertical side lower sealing portion 6 is connected to the lower end of the front vertical side sealing portion 2 through the lower molded portion 8, and extends from the connected portion to the lower end of the door body 310 along the front end of the door body 310. The lower end of the front vertical side lower sealing portion 6 is open. The rear vertical side sealing portion 4 extends to the lower end of the door body 310 along the rear end of the door body 310, and then extends forward along the lower end of the door body 310. The lower end of the rear vertical side sealing portion 4 is open. The lower end of the front vertical side lower sealing portion 6 and the lower end of the rear vertical side sealing portion 4 are separated from each other in the front-rear direction. As illustrated in FIGS. 2 and 3, the front vertical side lower sealing portion 6 is attached to a front vertical side lower sealing portion attachment plate 324*c* disposed between the outer panel outer surface 324*b* of the front vertical side 321 of the frame 320 and the bent portion 324*a*.

More specifically, the vertical side lower attachment portion 60 of the front vertical side lower sealing portion 6 is attached to the front vertical side lower sealing portion attachment plate 324*c* with, for example, a double face tape or a clip (not shown). The front vertical side lower sealing portion 6 includes a vertical side lower outer sealing lip 61 extending forward from the vehicle outer end of the vertical side lower attachment portion 60 and configured to be brought into elastic contact with the rear end of the front door 200 in closing the front door 200 and the rear door 300, and a vertical side lower inner sealing lip 62 extending forward from the vehicle inner end of the vertical side lower attachment portion 60 and configured to be brought into elastic contact with the vehicle outer surface of the bent portion 324*a* of the outer panel 324. The vertical side lower outer sealing lip 61, the vertical side lower attachment portion 60, and the vertical side lower inner sealing lip 62 constitute a vertical side lower water guide groove 64.

The upper molded portion 5 is a portion connecting the upper end of the front vertical side sealing portion 2 to the front end of the upper side sealing portion 3, and molded with a molding die (not shown) capable of being opened and closed. The lower molded portion 8 is a portion connecting the lower end of the front vertical side sealing portion 2 to the upper end of the front vertical side lower sealing portion 6, and molded with a molding die (not shown) capable of being opened and closed. Although the shape of the lower molded portion 8 is not shown in detail, the lower molded portion 8 is shaped such that a vertical side upper water guide groove 24 of the front vertical side sealing portion 2 and a vertical side lower water guide groove 64 of the front vertical side lower sealing portion 6 are connected to the lower molded portion 8.

The rear molded portion 7 connects the rear end of the upper side sealing portion 3 to the upper end of the rear vertical side sealing portion 4, and is molded with a molding die (not shown) capable of being opened and closed. A boundary between the upper side sealing portion 3 and the upper molded portion 5 is denoted by character L1, and a boundary between the front vertical side sealing portion 2 and the upper molded portion 5 is denoted by character L2.

A boundary between the upper side sealing portion 3 and the rear molded portion 7 is denoted by character L3, and a boundary between the rear vertical side sealing portion 4 and the rear molded portion 7 is denoted by character L4. A boundary between the front vertical side sealing portion 2 and the lower molded portion 8 is denoted by character L5, and a boundary between the front vertical side lower sealing portion 6 and the lower molded portion 8 is denoted by character L6.

Any rubber-like elastic material may be used as a material for the vehicle door sealing member 1. In the case of rubber, EPDM sponge rubber is preferable. In the case of a thermoplastic resin, foaming TPO or soft TPO is preferable.

As illustrated in FIG. 13, a portion of the vehicle door sealing member 1 extending in the front-rear direction along the upper side 322 of the frame 320 includes an upper side attachment portion 30 to be attached to the upper side 322, an upper side outer sealing lip 31 configured to be brought into elastic contact with an outer sealing surface 120*b* of the roof portion (vehicle body) 120 in closing the rear door 300, and an upper side inner sealing lip 32 separated from the upper side outer sealing lip 31 to the cabin inner side, extending in the front-rear direction, and configured to be brought into elastic contact with an inner sealing surface 120*c* of the roof portion (vehicle body) 120 in closing the rear door 300.

A portion of the vehicle door sealing member 1 extending in the front-rear direction along the upper side 322 includes the upper side sealing portion 3 and an upper-side side portion 5*a* of the upper molded portion 5. The upper side attachment portion 30 extends along the upper side sealing member attachment plate 325*a* in the upper side 322, and is to be attached to the upper side sealing member attachment plate 325*a*. For example, the lower surface of the upper side attachment portion 30 can be attached to the upper side sealing member attachment plate 325*a* with an adhesive (not shown) such as a double face tape. However, the present disclosure is not limited to this example, and the lower surface may be attached with an attachment member such as a clip (not shown).

Figure 10:
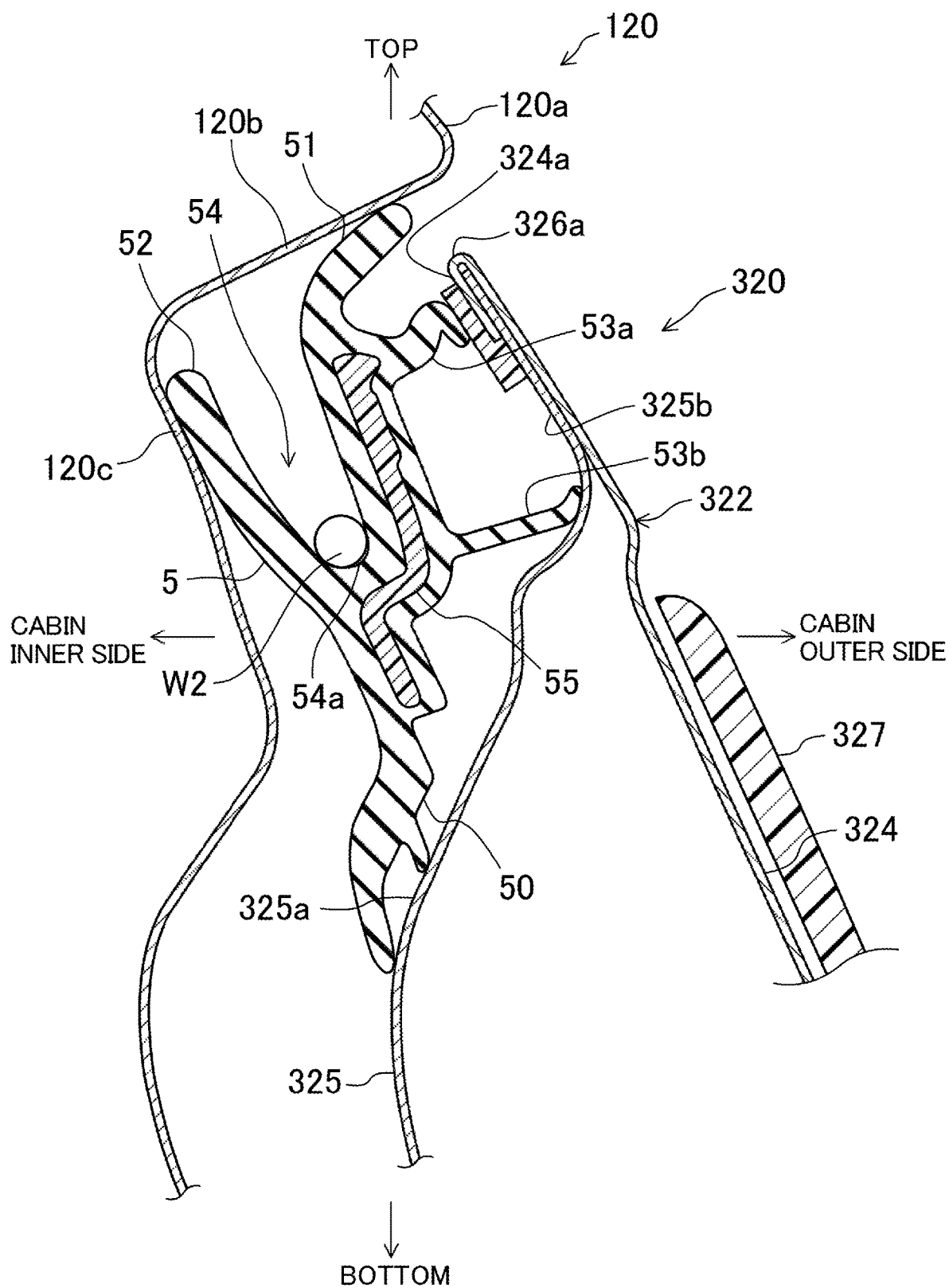
FIG. 10 is a cross-sectional view taken along line X-X in FIG. 8.

As illustrated in FIG. 10 (cross-sectional view taken along line X-X in FIG. 8), an upper molded portion core material 55 is embedded in an upper molded portion upper side attachment portion 50 and a lower portion of an upper molded portion upper side outer sealing lip 51. The upper molded portion core material 55 is made of a material harder than a rubber-like elastic material constituting an upper portion of the upper molded portion upper side outer sealing lip 51 and an upper molded portion upper side inner sealing lip 52, and has a plate shape extending in the top-bottom direction and also extending continuously in the front-rear direction.

An intermediate portion in the top-bottom direction of the upper molded portion core material 55 is bent such that a portion embedded in a lower portion of the upper molded portion upper side outer sealing lip 51 is located closer to the cabin outer side than a portion embedded in the upper molded portion upper side attachment portion 50. A lower projection 53*b* projecting to the cabin outer side and extending in the front-rear direction is formed near the lower end of the upper molded portion upper side outer sealing lip 51. The top end of the lower projection 53*b* is in elastic contact with a vicinity of the lower end of the inner panel upper plate 325*b*. An upper molded portion upper side back surface lip 53*a* projecting to the vehicle outer side and extending in the front-rear direction is formed near the upper end of the upper molded portion upper side outer sealing lip 51. The top end of the upper molded portion upper side back surface lip 53a is in elastic contact with the vehicle inner surface of the bent portion 324a.

As illustrated in FIG. 13, a lower portion of the upper side outer sealing lip 31 extends in the top-bottom direction, and an upper portion of the upper side outer sealing lip 31 is tilted or curved such that a portion closer to the upper end is located closer to the cabin outer side. When the upper side outer sealing lip 31 is in elastic contact with the vehicle outer sealing surface 120b of the roof portion 120, an upper portion of the upper side outer sealing lip 31 is thereby brought into elastic contact with the vehicle outer sealing surface 120b of the roof portion 120 in a curved or tilted state such that a portion of the upper portion closer to the upper end is located closer to the cabin outer side.

The upper side inner sealing lip 32 is tilted or curved such that a portion closer to the upper end is located closer to the cabin inner side. When the upper side inner sealing lip 32 is brought into elastic contact with the vehicle inner sealing surface 120c of the roof portion 120, the upper side inner sealing lip 32 is thereby warped to be deformed toward the cabin outer side as a whole. In closing the rear door 300, both the upper end of the upper side outer sealing lip 31 and the upper end of the upper side inner sealing lip 32 are in elastic contact with the roof portion 120, but the locations of the elastic contact are separated from each other in the cabin inside-outside direction.

While the rear door 300 is closed, a closed space is formed by the cabin inner surface of the upper side outer sealing lip 31, the cabin outer surface of the upper side inner sealing lip 32, and the roof portion 120. However, rain water or water for car washing (hereinafter collectively referred to as rain water or the like) might enter the inside of the cabin through a gap between the upper side outer sealing lip 31 and the vehicle outer sealing surface 120b of the roof portion 120 (as indicated by W1 in FIG. 13). The upper side inner sealing lip 32 inhibits entering, into the cabin, of rain water or the like that has entered the inside of the cabin through the gap between the upper side outer sealing lip 31 and the vehicle outer sealing surface 120b of the roof portion 120.

An upper side water guide groove 34 in which rain water or the like that has entered from the gap between the upper side outer sealing lip 31 and the vehicle outer sealing surface 120b of the roof portion 120 is allowed to flow in the front-rear direction is formed between the upper side outer sealing lip 31 and the upper side inner sealing lip 32. The entire upper side water guide groove 34 from the front end to the rear end thereof is disposed at the cabin inner side of the outer panel 324 of the flange upper side 326a of the frame 320. Accordingly, rain water or the like in the upper side water guide groove 34 flows at the cabin inner side of the outer panel 324 (as indicated by W1 in FIG. 13).

Figure 8:
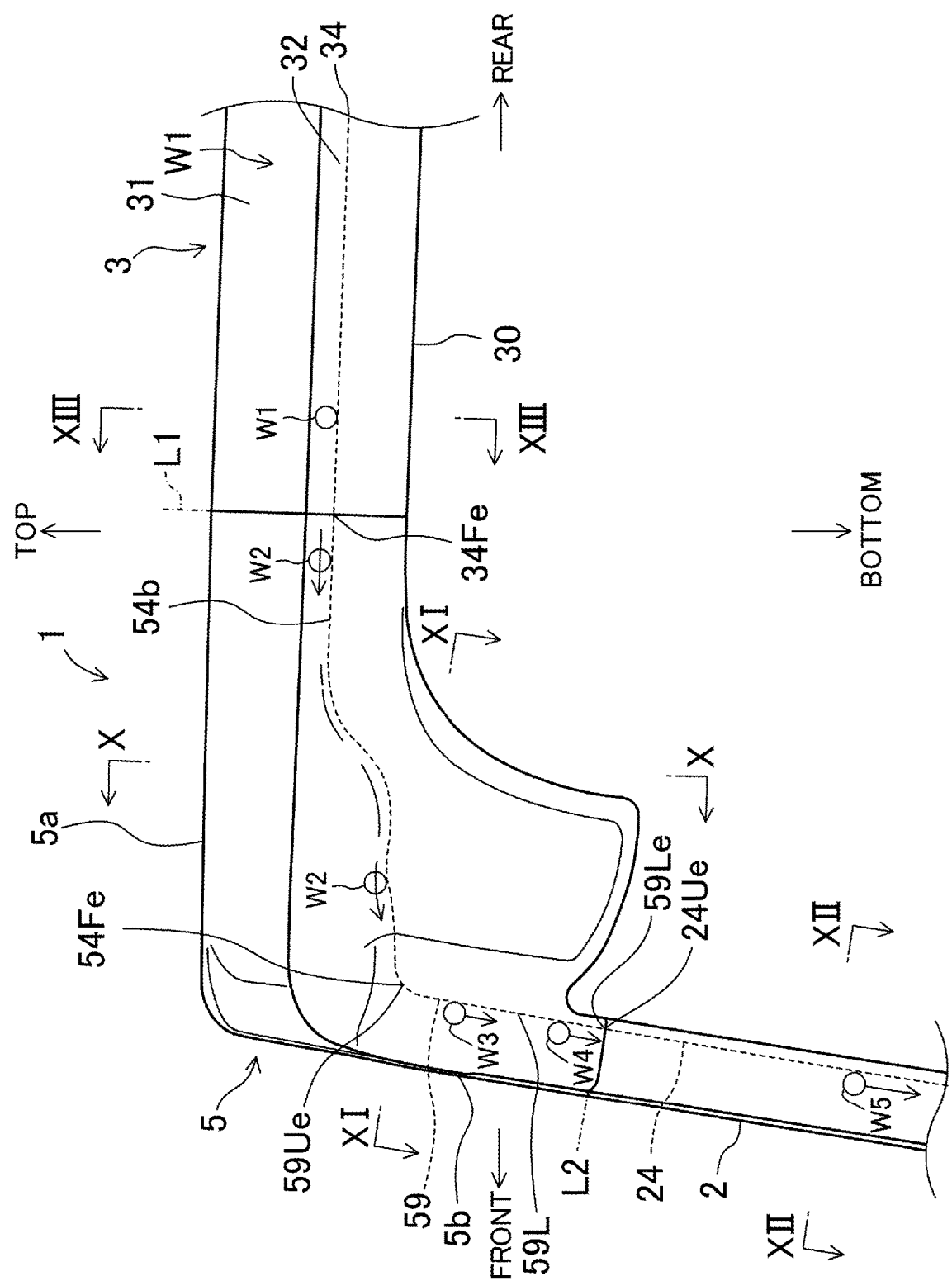
FIG. 8 is an enlarged view of the inside of a portion A illustrated in FIG. 7.
Figure 9:
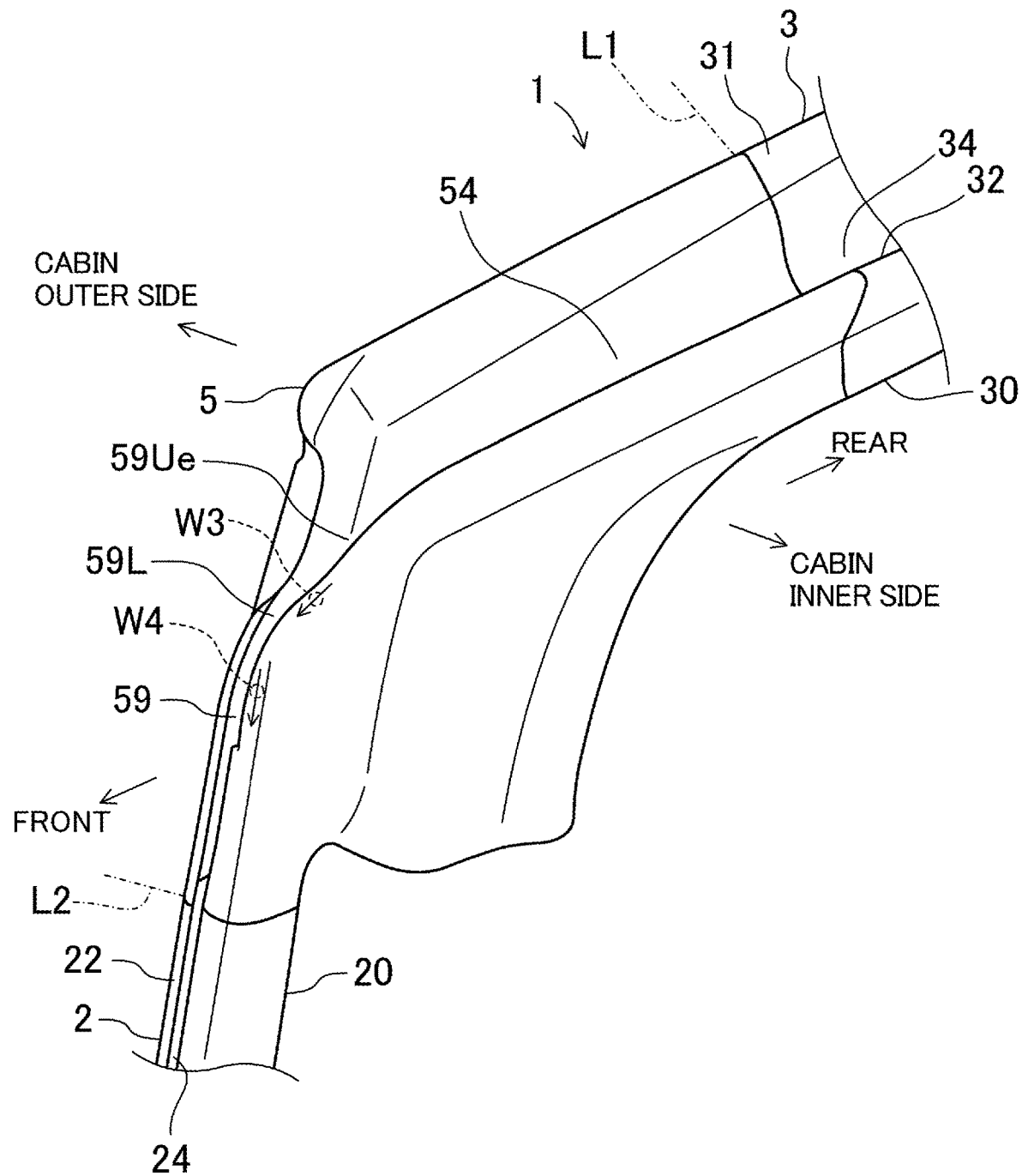
FIG. 9 is a perspective view of a portion in the portion A FIG. 7, when seen obliquely from above.

As indicated by the broken line in FIG. 8, a bottom portion 54b of an upper molded portion upper side water guide groove 54 is formed such that the bottom portion 54b is located at a lower position toward a front end portion 54Fe. Accordingly, the height of the bottom portion 54b of the upper side water guide groove 54 can be changed depending on locations so that rain water or the like in the upper molded portion upper side water guide groove 54 is allowed to flow forward (as indicated by W2 in FIGS. 8 and 10).

As illustrated in FIG. 12, a portion of the vehicle door sealing member 1 extending in the top-bottom direction along the front vertical side 321 of the frame 320 of the rear door 300 includes a vertical side upper attachment portion 20 to be attached to the front vertical side 321, a support wall 21 extending to the cabin outer side from the vertical side upper attachment portion 20, and a vertical side upper sealing lip 22 projecting forward from the support wall 21 and configured to be brought into elastic contact with the front door 200 in closing the front door 200 and the rear door 300.

As illustrated in FIG. 8, a portion of the vehicle door sealing member 1 extending in the top-bottom direction along the front vertical side 321 includes the front vertical side sealing portion 2 and a vertical side 5b of the upper molded portion 5. As illustrated in FIG. 12, the vertical side upper attachment portion 20 is a portion to be attached to the flange front vertical side 326b of the front vertical side 321, and extends in the top-bottom direction along the flange front vertical side 326b.

Specifically, the vertical side upper attachment portion 20 includes an inner wall 20a disposed at the cabin inner side of the flange front vertical side 326b, an outer wall 20b disposed at the cabin outer side of the flange front vertical side 326b, and a coupling wall 20c extending from the inner wall 20a to the outer wall 20b. The coupling wall 20c is a portion coupling the front end of the inner wall 20a to the front end of the outer wall 20b. The vertical side upper attachment portion 20 is formed by the inner wall 20a, the outer wall 20b, and the coupling wall 20c to be open rearward so that the flange front vertical side 326b is allowed to be inserted between the inner wall 20a and the outer wall 20b.

The flange front vertical side 326b inserted between the inner wall 20a and the outer wall 20b is held between a plurality of retention lips 20a1 provided on the vehicle outer surface of the inner wall 20a and a plurality of retention projections 20b1 provided on the vehicle inner surface of the outer wall 20b. A vertical side core material 25 made of a material harder than the vertical side upper sealing lip 22 is embedded in the inner wall 20a, the outer wall 20b, and the coupling wall 20c.

The vertical side core material 25 is made of a hard material similar to the upper molded portion core material 55. The vertical side core material 25 has a cross section that is open rearward and is similar to the cross section of the vertical side upper attachment portion 20. By embedding the vertical side core material 25, holding power of the flange front vertical side 326b by the vertical side upper attachment portion 20 is enhanced so that the vertical side upper attachment portion 20 can be attached firmly.

The support wall 21 projects to the cabin outer side from the rear end of the outer wall 20b, and extends in the top-bottom direction. The rear end of the support wall 21 is configured to be in elastic contact with the front end of the garnish 327. The vertical side upper sealing lip 22 projects forward from the end of the support wall 21 at the cabin outer side, extends in the top-bottom direction, and is curved or tilted such that a portion of the vertical side upper sealing lip 22 closer to the front end portion is located closer to the cabin inner side. Although not shown, while the front door 200 is open, the front end of the vertical side upper sealing lip 22 is separated to the cabin outer side from the front end of the outer wall 20b or the end of the coupling wall 20c at the cabin outer side, and a gap is formed between the vertical side upper sealing lip 22 and the vertical side upper attachment portion 20.

On the other hand, while both the front door 200 and the rear door 300 are closed, the rear end of the front door 200 is in elastic contact with the cabin outer surface of the vertical side upper sealing lip 22, and the vertical side upper sealing lip 22 is elastically deformed to be warped to the cabin inner side as a whole. Accordingly, the front end of the vertical side upper sealing lip 22 is brought into elastic contact with the front end of the outer wall 20b or the end of the coupling wall 20c at the cabin outer side so that the gap between the vertical side upper sealing lip 22 and the vertical side upper attachment portion 20 is closed. The vertical side upper sealing lip 22, the outer wall 20b, and the support wall 21 form the vertical side upper water guide groove 24 extending in the top-bottom direction.

As illustrated in FIG. 8, since an upper end 24Ue of the vertical side upper water guide groove 24 is connected to an upper molded portion vertical side water guide groove 59 and the front end portion 34Fe of the upper side water guide groove 34 through the upper molded portion upper side water guide groove 54. Thus, water can be smoothly discharged (as indicated by W2, W3, W4, and W5 in this order in FIG. 8). As indicated by FIGS. 2 and 3, the front vertical side lower sealing portion 6 has the vertical side lower water guide groove 64 whose cross-sectional shape is similar to that of the front vertical side sealing portion 2. As illustrated in FIG. 4, since the front vertical side lower sealing portion 6 extends to the lower end of the door body 310, a lower end 64Le of the vertical side lower water guide groove 64 is disposed at the lower end of the door body 310.

Figure 7:
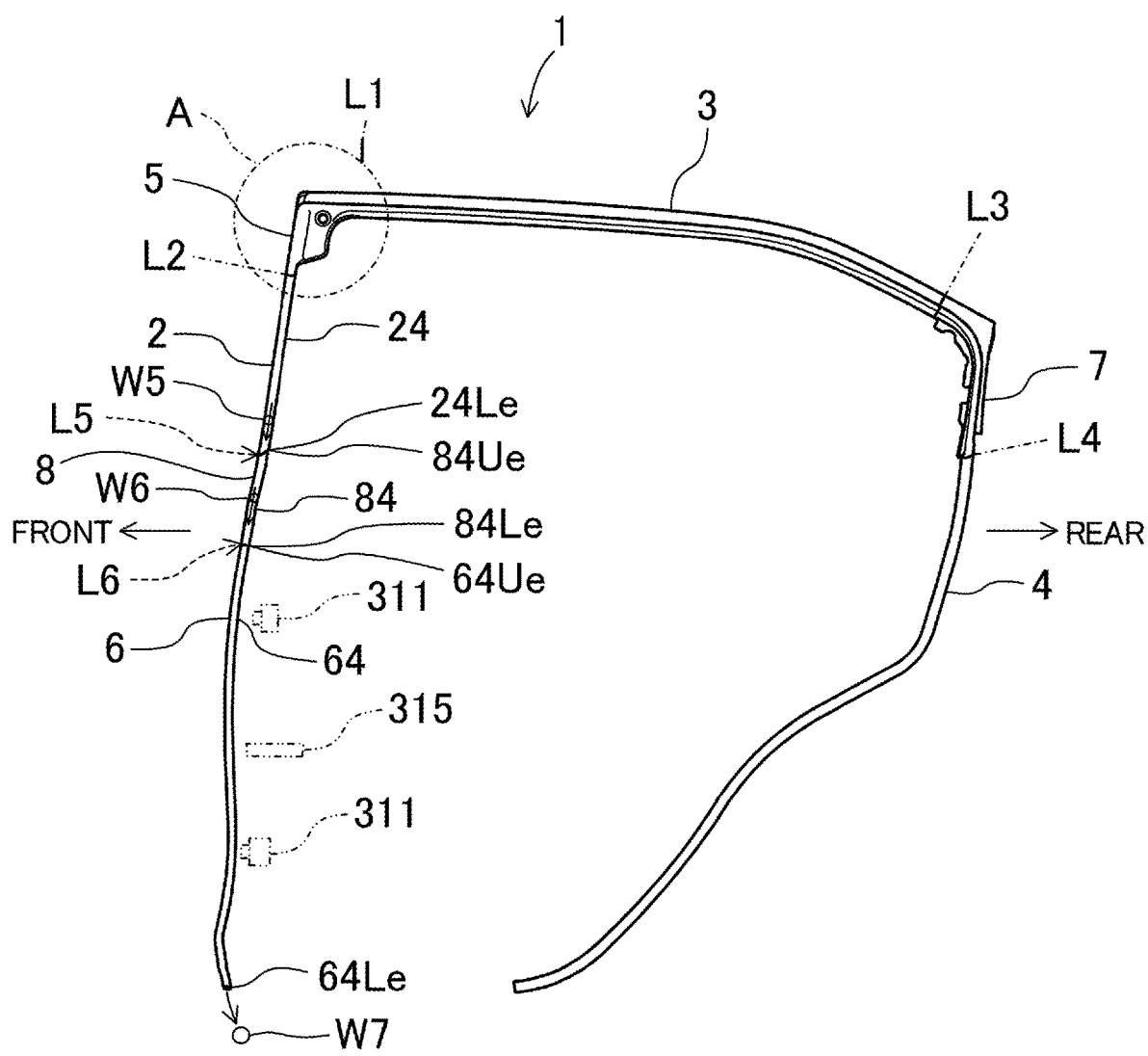
FIG. 7 is a view of the vehicle door sealing member seen from the cabin inner side.

Specifically, as illustrated in FIG. 8, the upper molded portion 5 connects the end of the upper side sealing portion 3 to the upper end of the front vertical side sealing portion 2. The upper molded portion 5 has the upper molded portion upper side water guide groove 54 connected to the end 34Fe of the upper side water guide groove 34, and also has the upper molded portion vertical side water guide groove 59 connected to the other end 54Fe of the upper molded portion upper side water guide groove 54. A lower end 59Le of the upper molded portion vertical side water guide groove 59 is connected to the upper end 24Ue of the vertical side upper water guide groove 24. More specifically, as illustrated in FIG. 7, a lower end 24Le of the vertical side upper water guide groove 24 is connected to an upper end 84Ue of the lower molded portion water guide groove 84, and a lower end 84Le of the lower molded portion water guide groove 84 is connected to an upper end 64Ue of the vertical side lower water guide groove 64. As illustrated in FIG. 4, the lower end 64Le of the vertical side lower water guide groove 64 is disposed at the lower end of the door body 310.

With this configuration, water W5 in the vertical side upper water guide groove 24 is discharged at a location below the door latch device 213, the door hinges 311, and the door checker 315 (as indicated by W5, W6, and W7 in this order in FIG. 7).

Figure 5:
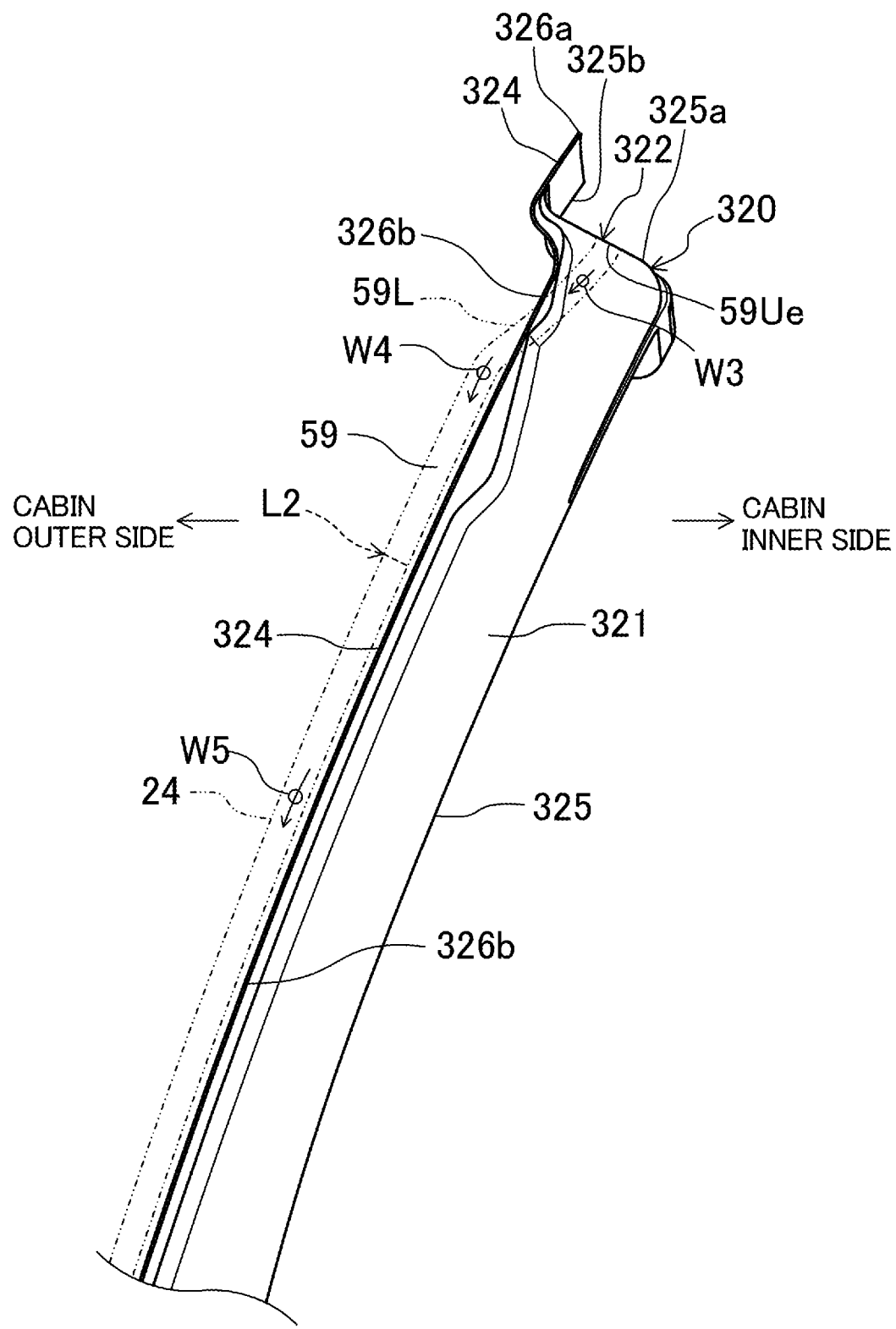
FIG. 5 is a view of a frame seen from the front.

As indicated by imaginary lines in FIG. 5 and in FIG. 8, an upper end 59Ue of the upper molded portion vertical side water guide groove 59 is connected to the front end 54Fe of the upper molded portion upper side water guide groove 54, and thus, the upper end 59Ue is located at the cabin inner side of the flange upper side 326a of the outer panel 324 of the upper side 322 of the frame 320. A lower portion 59L of the upper molded portion vertical side water guide groove 59 extends downward from the upper end 59Ue, and extends to the cabin outer side of the flange upper side 326a of the outer panel 324.

Figure 6:
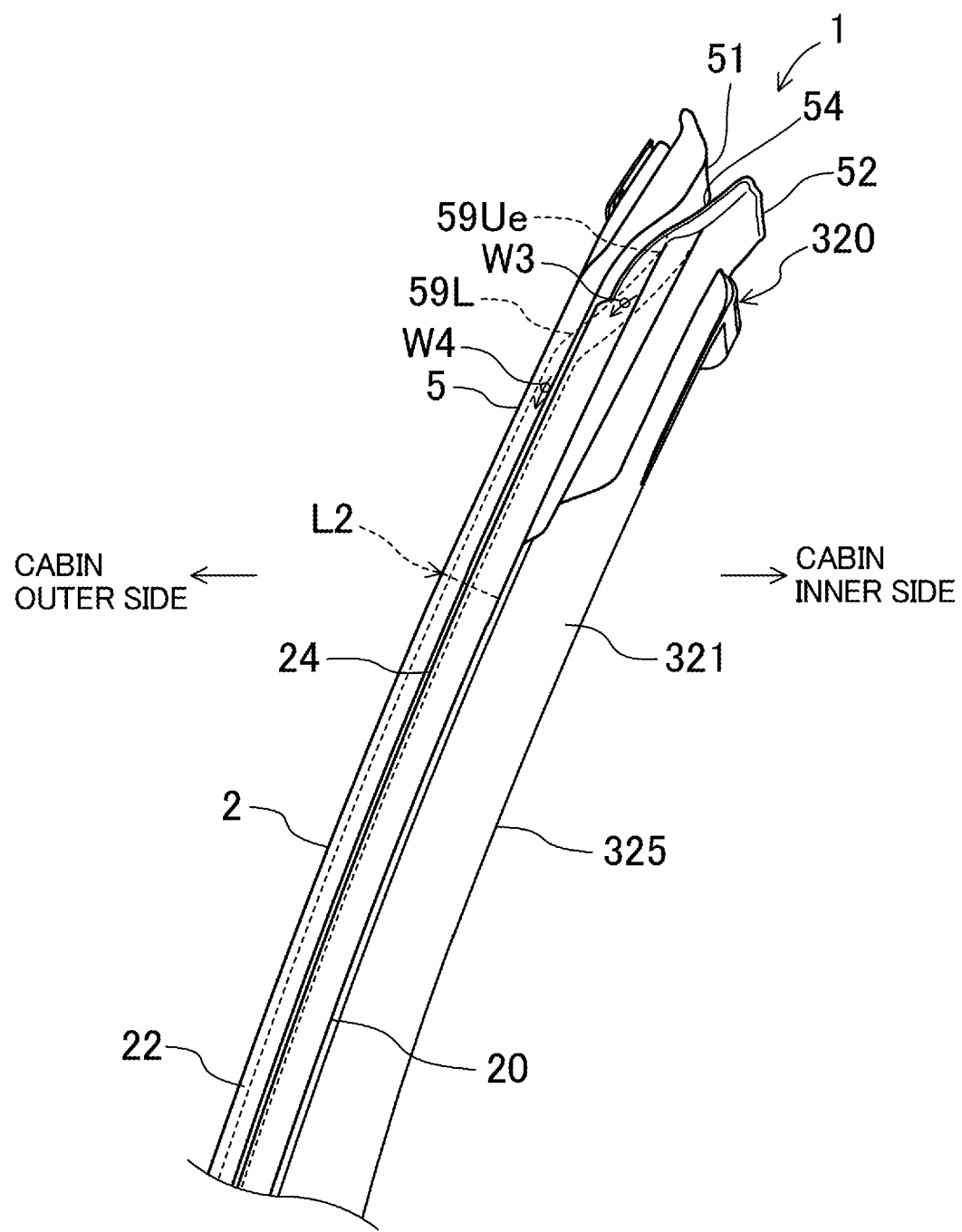
FIG. 6 is a view of the frame to which the vehicle door sealing member is attached, when seen from the front.

That is, a portion of the upper molded portion vertical side water guide groove 59 below the upper end 59Ue includes an upper molded portion vertical side water guide groove lower portion 59L that extends downward and is bent to the cabin outer side. The upper molded portion vertical side water guide groove lower portion 59L enables the lower end to be disposed at the cabin outer side of the flange upper side 326a of the outer panel 324 with the upper end 59Ue being disposed at the cabin inner side of the flange upper side 326a of the outer panel 324 so that water is allowed to be guided to the cabin outer side (as indicated by W3 to W4 in FIGS. 5, 6, and 8).

Figure 11:
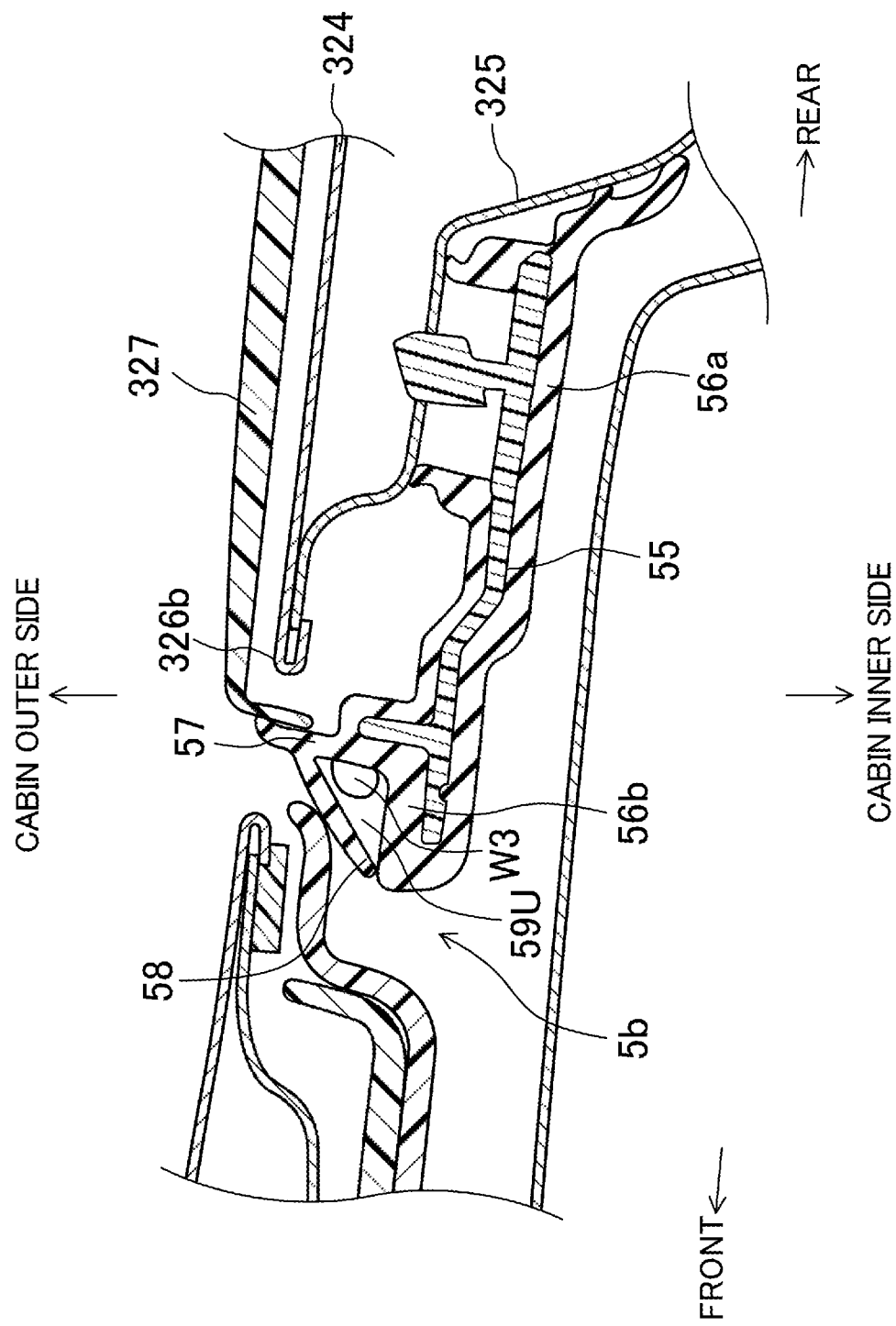
FIG. 11 is a cross-sectional view taken along line XI-XI in FIG. 8.

As illustrated in FIG. 11 (cross-sectional view taken along line XI-XI in FIG. 8), in the vertical side portion 5b of the upper molded portion 5, an upper molded portion vertical side front end attachment portion 56b is provided at the front side of an upper molded portion vertical side attachment portion 56a, an upper molded portion vertical side support wall 57 extends to the vehicle outer side from the vehicle outer surface of the upper molded portion vertical side front end attachment portion 56b, and an upper molded portion vertical side outer sealing lip 58 extends, while being tilted, toward the vehicle inner side from a vehicle outer portion of the upper molded portion vertical side support wall 57.

Here, in the vertical side 5b of the upper molded portion 5, the flange front vertical side 326b is located outside the upper molded portion vertical side support wall 57. As illustrated in FIG. 12 (cross-sectional view taken along line XII-XII in FIG. 8), in a portion to which the front vertical side sealing portion 2 is attached, the flange front vertical side 326b is located inside the outer wall 20b. That is, as illustrated in FIGS. 5, 11, and 12, in a section where the flange front vertical side 326b is at the outer side and at the rear side, the water guide groove of the vehicle door sealing member 1 is displaced from the vehicle inner side to the vehicle outer side, and in its underlying section, the flange front vertical side 326b is displaced from the vehicle outer side to the vehicle inner side so that the flange front vertical side 326b does not intersect or interfere with the displacement section of the water guide groove and water can be smoothly guided.

Advantages of Embodiment

As described above, in this embodiment, when the rear door 300 is closed as illustrated in FIG. 13, the upper side outer sealing lip 31 and the upper side inner sealing lip 32 of the upper side sealing portion 3 are brought into elastic contact with the roof portion 120. As illustrated in FIG. 12, when the front door 200 is additionally closed, the vertical side upper sealing lip 22 is brought into elastic contact with the rear end of the front door 200.

In a case where rain water or the like enters the inside of the cabin through a gap between the upper side outer sealing lip 31 and the outer sealing surface 120b of the roof portion 120 with the rear door 300 closed, the rain water or the like might flow forward in the upper side water guide groove 34. Rain water or the like that has flowed forward in the upper side water guide groove 34 passes through the upper molded portion upper side water guide groove 54 and the upper molded portion vertical side water guide groove 59 from the front end portion 34Fe of the upper side water guide groove 34, enters the upper end 24Ue of the vertical side upper water guide groove 24, and flows downward in the vertical side upper water guide groove 24.

Since the upper molded portion vertical side water guide groove 59 includes the upper molded portion vertical side water guide groove lower portion 59L that is bent to the cabin outer side, rain water or the like in the upper molded portion vertical side water guide groove 59 can be guided to the cabin outer side of the outer panel 324.

In addition, since the vertical side upper water guide groove 24 is connected to the vertical side lower water guide groove 64 of the front vertical side lower sealing portion 6 through a lower molded portion water guide groove (not shown), the vertical side upper water guide groove 24 extends below the lower rear door hinge 311. Thus, rain water or the like can be guided to a portion below the lower rear door hinge 311, and discharged from a vicinity of the lower end of the door body 310. Accordingly, rain water or the like that has entered the gap between the upper end of the rear door 300 and the roof portion 120 is hardly splashed onto the rear door latch device 213, the rear door hinges 311, and the rear door checker 315.

The above-described embodiment is merely an example in all respects, and should not be construed as limiting. Further, all variations and modifications belonging to the equivalent scope of the claims are within the scope of the present disclosure.

The embodiment is directed to the example of only the vehicle door sealing member attached to the rear door, but is applicable to a front door. The embodiment is also applicable to a right door or a left door of rear doors in a vehicle.

As described above, the vehicle door sealing member according to present disclosure can be used for, for example, a rear door.

What is claimed is:

1. A vehicle door sealing member configured to be attached to a first door for opening and closing a door opening in a side portion of a vehicle body of a vehicle, the vehicle door sealing member being configured to seal a gap between the door opening and the first door, wherein
    a portion extending in a vehicle front-rear direction along an upper side of a frame of the first door includes an upper side sealing portion, the upper side sealing portion including an upper side attachment portion configured to be attached to the upper side, an upper side outer sealing lip configured to be brought into elastic contact with the vehicle body in closing the first door, and an upper side inner sealing lip separated from the upper side outer sealing lip to a cabin inner side and configured to be brought into elastic contact with the vehicle body in closing the first door,
    an upper side water guide groove is formed between the upper side outer sealing lip and the upper side inner sealing lip such that water that has entered from a gap between the upper side outer sealing lip and the vehicle body is allowed to flow in the vehicle front-rear direction in the upper side water guide groove,
    a portion extending in a top-bottom direction along a vertical side of the frame of the first door includes a vertical side sealing portion, the vertical side sealing portion including a vertical side upper attachment portion configured to be attached to the vertical side, a support wall extending from the vertical side upper attachment portion to a cabin outer side, and a vertical side upper sealing lip projecting from the support wall to one side in the vehicle front-rear direction, and configured to be brought into contact with a second door in closing the first door and the second door,
    a vertical side upper water guide groove is formed between the vertical side upper attachment portion and the vertical side upper sealing lip,
    an upper molded portion is provided to connect an end of the upper side sealing portion and an upper end of the vertical side sealing portion to each other, and
    the upper side water guide groove and the vertical side upper water guide groove are connected to each other through the upper molded portion.

2. The vehicle door sealing member according to claim 1, wherein
    the upper molded portion has an upper molded portion upper side water guide groove and an upper molded portion vertical side water guide groove, the upper molded portion upper side water guide groove being connected to an end of the upper side water guide groove, the upper molded portion vertical side water guide groove being connected to the another end of the upper molded portion upper side water guide groove,
    a lower end of the upper molded portion vertical side water guide groove is connected to an upper end of the vertical side upper water guide groove,
    the upper side water guide groove is disposed at a cabin inner side of a flange upper side of an outer panel constituting a cabin outer side of the upper side of the frame,
    an upper end of the upper molded portion vertical side water guide groove is disposed at a cabin inner side of a flange vertical side of an outer panel constituting a cabin outer side of the vertical side of the frame, and
    a lower portion of the upper molded portion vertical side water guide groove extends downward from the upper end, and extends to a cabin outer side of the flange vertical side of the outer panel constituting the cabin outer side of the vertical side of the frame.

3. The vehicle door sealing member according to claim 1, wherein
    a lower molded portion is connected to a lower end of the vertical side sealing portion, and a vertical side lower sealing portion is connected to a lower end of the lower molded portion,
    a lower molded portion water guide groove is connected to a lower end of the vertical side upper water guide groove, and a vertical side lower water guide groove is connected to a lower end of the lower molded portion water guide groove, and
    a lower end of the vertical side lower water guide groove is located below a door opening/closing device configured to open and close the first door and the second door.

4. The vehicle door sealing member according to claim 2, wherein
    a bottom portion of the upper molded portion upper side water guide groove is located at a lower position toward a first end in the vehicle front-rear direction.

5. The vehicle door sealing member according to claim 1, wherein
    the vertical side upper attachment portion includes an inner wall disposed at a cabin inner side of a flange vertical side of the vertical side, the flange vertical side extending in the top-bottom direction, an outer wall disposed at a cabin outer side of the flange vertical side, and a coupling wall extending from the inner wall to the outer wall and coupling the inner wall and the outer wall to each other,
    the support wall projects to a cabin outer side from a second end of the outer wall in the vehicle front-rear direction, and
    the vertical side upper water guide groove is formed by the vertical side upper sealing lip, the outer wall, and the support wall.

6. The vehicle door sealing member according to claim 5, wherein a vertical side core material of a material harder than a material constituting the vertical side upper sealing lip is embedded in the inner wall, the outer wall, and the coupling wall.

7. The vehicle door sealing member according to claim 1, wherein the vertical side upper sealing lip is curved or bent such that the vertical side upper sealing lip is located closer to a cabin inner side toward a first end in vehicle front-rear direction.

8. The vehicle door sealing member according to claim 1, wherein the upper side outer sealing lip is configured to be brought into elastic contact with the vehicle body in a state where the upper side outer sealing lip is curved or tilted to be located closer to a cabin outer side toward an upper end of the upper side outer sealing lip.

\* \* \* \* \*